United States Patent [19]

Beer

[11] Patent Number: 4,669,711

[45] Date of Patent: Jun. 2, 1987

[54] RESILIENT MOUNT AND ENGINE MOUNTING ARRANGEMENT

[76] Inventor: Wilhelm Beer, Adam-Opel-Strasse 9, 6090 Russelsheim, Fed. Rep. of Germany

[21] Appl. No.: 764,348

[22] Filed: Aug. 12, 1985

[30] Foreign Application Priority Data

Aug. 24, 1984 [DE] Fed. Rep. of Germany ....... 3431117

[51] Int. Cl.⁴ .......................... F16F 1/36; F16F 15/03
[52] U.S. Cl. .................................. 267/140.1; 188/267
[58] Field of Search ..................... 188/267; 248/638; 267/140.1

[56] References Cited

U.S. PATENT DOCUMENTS 3,301,141  1/1967  Griffing .......................... 188/267 X

FOREIGN PATENT DOCUMENTS

| 2927757 | 2/1981 | Fed. Rep. of Germany ...... 188/267 |
| 0065640 | 4/1984 | Japan .................................... 188/267 |
| 0259568 | 12/1969 | U.S.S.R. ............................. 188/267 |
| 0750172 | 7/1980 | U.S.S.R. ............................. 188/267 |

*Primary Examiner*—Duane A. Reger

[57] ABSTRACT

A resilient mount is disclosed comprising a spring element retained between two mount retaining means and a controllable magnet fastened to one of the two mount retaining means. The magnet is adapted to cooperate with a magnetically responsive element to vary the spring characteristic of the resilient mount on a continuous basis with the magnetically responsive element fixed inside the spring element.

3 Claims, 1 Drawing Figure

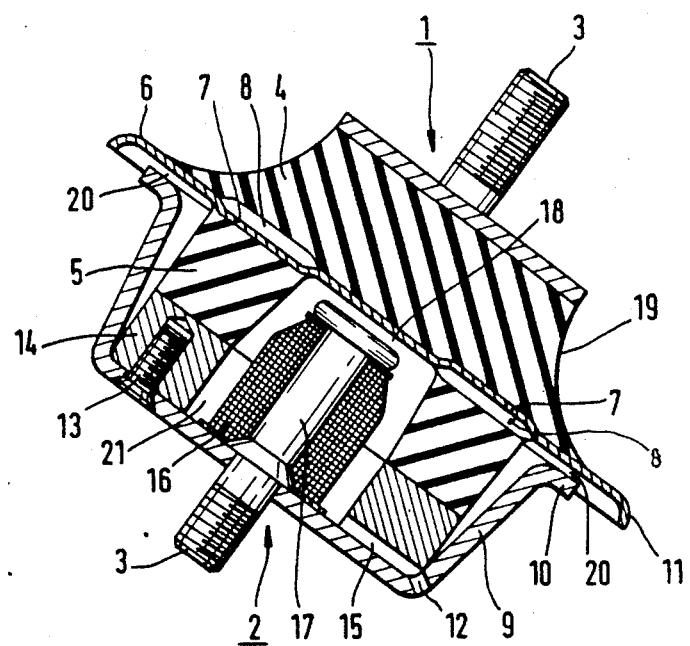

RESILIENT MOUNT AND ENGINE MOUNTING ARRANGEMENT

TECHNICAL FIELD

The invention relates to a resilient mount including an elastomeric spring member inserted between mount retaining means, and a controllable magnet which is secured to one of the mount retaining means and which is adapted to cooperate with a magnetically responsive element so as to vary the spring characteristic of the resilient mount.

BACKGROUND OF THE INVENTION

Resilient mounts of this type are known in the art, especially in the form of compression-type rubber metal mounts, and are employed, for instance, as engine mounts in motor vehicles. The reason for using engine mounts of this type is to improve the acoustic and vibratory comfort. If the choice is in favor of relatively hard rubber metal mounts, the advantage gained is that the low frequency vibrations are transmitted by the rubber metal mounts in a relatively rigid manner so that one need not be concerned about residual vibrations. Thus, the engine will not be subjected to residual vibrations and will not transmit objectionable low frequency vibrations to the body structure. However, the disadvantage of hard rubber metal mounts is that the high engine frequencies will also be transmitted, relatively unimpeded, onto the vehicle body, which adversely effects the acoustic comfort. If, on the other hand, one selects a relatively soft rubber metal mount, the high frequencies will be transmitted only to a very limited degree, and this means, in the case of motor vehicle engine mounts, that the higher natural acoustic vibrations generated by the engine are of little effect inside the vehicle, so that the acoustic comfort is correspondingly high. However, the engine will then be subjected to low frequency vibrations which may be induced, for instance, by the irregularities in the road surface. Thus, the low frequency comfort level in vehicles employing soft engine mounts is relatively poor.

Consequently, a rubber metal mount, i.e., a resilient mount alone is only a compromise between the conflicting demands of providing a soft as well as a rigid engine suspension.

Because of the aforementioned considerations, it has been proposed in the German publication No. DE-OS 29 27 757 to provide a space in the spring element for a magnetizable metal powder which is subjected to the magnetic field of a magnet attached to one of the mount retaining means provided for the engine mount. When this magnetic powder is magnetized by the electromagnet, it is compacted and impedes the resiliency of the spring element. This will then accomplish a variation of the spring characteristic of the engine mount. However, this arrangement is afflicted with the shortcoming that the metal powder, as it is subjected to the magnetic field, is merely hardened so as to form a solid body, without retaining any degree of elasticity. As a result, the spring element is subjected to a relatively high load because of the collision that occurs between it and the metal powder that has been solidified by the magnetic field, and it is therefore relatively difficult to control the spring characterisitcs of this prior art resilient mount.

SUMMARY OF THE PRESENT INVENTION

The primary object of the present invention to provide a resilient engine mount of the type described in the foregoing which has a long service life and which permits a substantially continuously variable control of its spring characteristics.

In accordance with the present invention, this objective is accomplished with a magnetically responsive element that is fixedly mounted inside the spring element so as to provide in the rubber element, in addition to the force acting in the same through the mount retaining means, a further force that can be superposed. The resultant force in the elastomeric member is thus different from the one between the mount retaining means and corresponds to a change in the spring rate. This can be accomplished at a given deflection of the resilient mount, i.e., the spring element, so that the invention not only provides the means to harden the mount in elastically, but also enables selection of any given effective spring rate on the resilient mount because the magnet can be controlled at will. For instance, the magnet can be adjusted to a given force, i.e., magnetic field, and a corresponding force can be imparted to the magnetic element disposed inside the resilient mount.

This concept is particularly suitable for application in resilient mounts which have oppositely disposed mount retaining means, in that inside the spring element there is arranged in the direction transversely of the operative direction of the spring element, i.e., transversely of the axis connecting the mount retaining means, a readily magnetizable, especially ferro-magnetic armature plate, with the magnet being oriented relative to the armature plate in the operative direction of the spring element and being spaced apart from the armature plate at a given gap width. This arrangement provides that the force of the magnet acts on the armature plate in a direction parallel to the portion of the spring element disposed between the mount retaining means carrying the magnet and the armature plate. Thus, the magnet is adapted to vary the spring rate of the spring element in response to variations of the force acting between the armature plate and the magnet, and for this purpose, the magnet is adapted to be selectively controlled. Since the magnet is spaced apart from the armature plate and, consequently, a gap exists therebetween, it is apparent that the deflections of the resilient mount according to the invention may be of varying magnitude, which results in a magnetically variable spring rate. The gap between the magnet and the armature plate also enables compensation for settling phenomena that may occur in the resilient mount. Furthermore, adjustability of the gap enables the magnetic action to be functionally optimized. The arrangement may be such that the gap is automatically adjustable.

Preferably, the magnet is in the form of an electromagnet provided with a coil and is arranged in a cavity of the spring element with outwardly extending passages. In this instance, the deflections of the spring element will cause the volume of the cavity to be varied and the outwardly extending passages enable the cavity to breathe and to communicate with the atmosphere. This arrangement also provides cooling of the coil of the electromagnet. By selectively controlling the electric current in the coil of the electromagnet, the operation of the electromagnet is rendered variable and, as a result, the force exerted by it on the armature is of variable magnitude.

A particularly stable and electromagnetically efficient design configuration of the resilient mount according to the invention is one wherein the mount retaining means with the magnet is in the form of a readily magnetizable, especially ferro-magnetic bell-shaped member in which the magnet is disposed, and wherein the armature plate extends past the edge of the bell-shaped member and is spaced apart therefrom at a given gap width. This arrangement will provide that not only the core of the coil of the magnet is acting on the armature plate, but also the edge of the bell-shaped member which is magnetically connected with the core of the coil. As a result, the magnetic field will remain, for the most part, fixed only to the magnet between the armature plate and the one mount retaining member, so as to help make the system, consistent with the objectives of the invention, functionally effective. The purpose of the gap between the edge of the bell-shaped member and the armature plate is the same as that of the gap between the armature plate and the magnet itself. The bell-shaped member is mechanically very stable and is, if need should arise, adapted to be engaged by the armature plate, especially if the magnet is subjected to overloads. In anticipation of such occurrences, the invention also proposes that the gap between the armature and the magnet be somewhat wider than the one between the edge of the bell-shaped member and the armature plate so as to prevent the mechanically delicate magnet from being put under a load if it should be engaged by the relatively stiff armature plate, even if the latter is covered with a layer of rubber.

The invention also relates to a mounting arrangement for an engine incorporating a crankshaft, including at least one active resilient engine mount controlled by a pulse generator which is synchronized to the vibrations of the engine and which includes an electric power amplifier.

A mounting arrangement of this type is described in the European Patent Application 0081 085. In the structure, there disclosed the rubber metal mount is hydraulically controlled by the pulse generator which is synchronized to the engine vibrations and is provided with the electric power amplifier. While a system of this type is also capable of varying the spring rate, the expenditures involved in achieving a variable spring rate are relatively high and the system is problematic. First of all, one must see to it that the spring variation, i.e., the hydraulic pressures in the rubber metal mount itself, are in phase with the vibrations of the engine. In the case of varying vibratory frequencies, this means that a relatively complex phase shifter must be employed. Furthermore, the conversion of the signals emitted by the pulse generator into hydraulic pressures of varying magnitudes necessitates the use of an electromechanical converter which, in turn, is operatively associated with a mechanical-hydraulic converter. The size and complexity of these devices make it difficult if not impossible for them to be directly integrated into the resilient mount, so that relatively long hydraulic conduits are needed to connect the hydraulic converter with the resilient mount. However, these hydraulic lines must have a certain degree of flexibility and, at the same time, must be high-pressure resistant and, more importantly, water hammer resistant. These requirements all have an effect on the cost factor of these lines. Finally, means must be provided which enable the hydraulic system, i.e., the mechanical-hydraulic converter, the hydraulic lines and the hydraulic rubber-metal mount, to be completely ventilated, which will result in final assembly costs that will be considerably higher.

It is also a primary object of the present invention to provide an engine mount of the type described above which is not afflicted with phase problems and which for this reason alone, as well as for other reasons, is less costly.

This objective is also accomplished with a resilient mount of a configuration like already described according to the present invention.

The reason that phase problems can be eliminated in the resilient mount according to the invention is that the spring rate is varied exclusively by electric means and that, in contrast to hydraulic control means, there is no inertia involved. Furthermore, the arrangement according to the invention does not require the use of a mechanical-hydraulic converter and is therefore much simpler and less costly than prior art systems. Also, there is no need to incorporate special ventilating means into the novel engine mount or to resort to special procedures during final assembly. Hydraulic lines used in prior art systems, which had to meet stringent demands, can be dispensed with inasmuch as the new system requires only simple electric wiring which is, by nature, flexible and, unlike hydraulic lines, transmits practically no acoustic vibrations. Finally, the resilient mount with the magnetically controlled spring rate varying means according to the invention is in the form of one single integral component and is very compact.

When employing the subject resilient mount in an engine mounting arrangement according to the invention, it is preferable that the engine suspension be initially rigid, more particularly, twice as rigid as in a system having no variable spring rate provisions so as to establish at the outset a good low-frequency vibratory comfort. In the high-frequency range, i.e. about 15 Hz and up, the magnetic spring rate variation is permitted to interact with the spring forces on equal terms. The result is that the mount is able to operate within a lower spring rate range and is therefore softer. As mentioned earlier, this arrangement provides satisfactory isolation of the high-frequency vibrations. The mounting arrangement is particularly effective for controlling inertia forces of the second order, i.e., forces which occur at twice the frequency of the crankshaft speed on a four-cylinder in-line engine. Inversely, one might also select a soft mount, which could then be stiffened, by means of the magnetic spring rate varying means, in the range of the low-frequency vibrations. Also, the mount could be controlled by signals representing the unevenness of the road surface or the engine deflections.

The invention will now be described by way of the resilient mount illustrated in the accompanying drawing.

Numerals 1 and 2 designate the mount retaining means which are in the form of threaded studs 3 and are aligned oppositely to each other. The elastomeric member, which is disposed between the threaded studs 3, is split up by the armature plate 6 into an upper elastomeric portion 4 and a lower elastomeric portion 5. Thus, the upper elastomeric portion 4 connects the one mount retaining means 1 with the armature plate 6, whereas the lower elastomeric portion 5 connects the armature plate 6 with the other mount retaining means 2. The mount retaining means 2 is in the form of a bell-shaped member 9. In examining the drawing, one should note that the illustrated resilient mount is substantially dynamically balanced about the axis of alignment of the threaded studs 3. Thus, the member 6 of the resilient mount has the form of a dynamically balanced cup, or actually that of a church bell. Its outer edge extends radially outwardly so as to provide good surface contact for the armature plate 6 which extends past the peripheral edge 10.

The armature plate 6 is also provided with a collar 11 which curves downwardly towards the edge 10 of the armature plate, so that a labyrinth-type seal is formed with the gap 20 between the outer edge 10 and the armature plate 6. This arrangement thus provides an umbrella-like shield to prevent dirt from entering into the area around the gap 20. The upper elastomeric portion 4 has a flank portion 19 which extends outwardly and up to the edge 10 of the armature plate 6 so as to assist in suppressing radiation of airborne acoustic vibrations. Furthermore, the armature plate 6 has reinforcement portions 7 that are formed by stamping operations, and one will also note in the drawing reinforcement flanks which are denoted by the numeral 8.

The armature plate 6 is covered with a layer of rubber (not illustrated in the drawing) so as to protect the same against corrosion. The rubber layer also serves to protect the armature plate if it should ever strike the peripheral edge 10 of the bell-shaped member 9, and it will also dampen the metallic noise that might be generated by the engagement of these two members. The lower elastomeric portion 5 is a massive rubber ring which is vulcanized onto a ring-shaped support member 14. The support member 14 is provided with blind holes for receiving screw 13 by which the ring-shaped support member 14 is fastened to the bottom of the bell-shaped member 9.

In the exemplary embodiment illustrated in the drawing, the screws 13 extend through apertures provided in the bottom of the bell-shaped member 9 and are countersunk therein. The ring-shaped support member 14 has radially extending passages 15 which terminate in ports 12 provided in the bell-shaped member 9. This arrangement thus provides communication between the cavity 21 for the magnet and ambient air. The cavity 21 is defined, on the one hand, by the lower rubber portion 5 and the ring-shaped support member 14 and, on the other hand, by the coil 16 and the core 17, and is closed off on the top and the bottom by the armature plate 6 and the bottom of the bell-shaped member 9, respectively. The coil 16 is arranged in a conventional manner on the core 17, and a magnetic flow path is established between the core 17 and the bellshaped member 9.

One will also note in the drawing the gap 18 between the enlarged end portion of the core 17 and the center portion of the armature plate 6. The installation position of the resilient mount illustrated in the drawing serves only as an example, without limiting the scope of the invention. For example, the mount can be installed inversely, i.e., turned at an angle of 180°, or in any other suitable position.

The above described preferred embodiment is thus intended to be illustrative of the invention which may be modified within the scope of the appended claims.

The embodiments of the invention in which an exclusive property or privilege is claimed are defined as follows:

1. A flexible mounting comprising an elastomeric spring body inserted between two mount retaining means, and a controllable magnet which is attached to one of the mount retaining means and which coacts with a magnetically acting element to vary the spring quality of the mounting, characterized by the magnetically acting element being firmly embedded in the spring body, the mount retaining means being opposite each other, the magnetically acting element being a ferromagnetic armature plate that extends transversely to the direction of the mount retaining means, and the magnet extending in the direction of action of the spring body towards the armature plate and spaced apart therefrom by a gap.

2. A flexible mounting comprising an elastomeric spring body inserted between two mount retaining means, and a controllable magnet which is attached to one of the mount retaining means and which coacts with a magnetically acting element to vary the spring quality of the mounting, characterized by the magnetically acting element being firmly embedded in the spring body, the mount retaining means being opposite each other, the magnetically acting element being a ferromagnetic armature plate that extends transversely to the direction of the mount retaining means, and the magnet extending in the direction of action of the spring body towards the armature plate and spaced apart therefrom by a gap, and the magnet being constructed as an electromagnet with a coil and being disposed in a cavity in the spring body having channels that lead outwardly.

3. A flexible mounting according to claim 1, further characterized by the said one mount retaining means being constructed with the magnet as a readily magnetizable ferro-magnetic bearing cup in which the magnet is disposed and the armature plate extending beyond the edge of the bearing cup and spaced apart therefrom by said gap.

* * * * *

UNITED STATES PATENT AND TRADEMARK OFFICE
CERTIFICATE OF CORRECTION

PATENT NO. : 4,669,711

DATED : June 2, 1987

INVENTOR(S) : Wilhelm Beer

It is certified that error appears in the above-identified patent and that said Letters Patent is hereby corrected as shown below:

On the cover page, insert -- Assignee General Motors Corporation --, also insert -- Attorney: R. L. Phillips --.

Signed and Sealed this

Nineteenth Day of January, 1988

Attest:

DONALD J. QUIGG

*Attesting Officer*  *Commissioner of Patents and Trademarks*